Jan. 9, 1940.    J. JANDASEK    2,186,025
POWER TRANSMISSION
Original Filed Aug. 14, 1930    6 Sheets-Sheet 1

INVENTOR
Joseph Jandasek

Jan. 9, 1940.   J. JANDASEK   2,186,025
POWER TRANSMISSION
Original Filed Aug. 14, 1930   6 Sheets-Sheet 2

INVENTOR
Joseph Jandasek

INVENTOR
*Joseph Jandasek*

Jan. 9, 1940.  J. JANDASEK  2,186,025
POWER TRANSMISSION
Original Filed Aug. 14, 1930  6 Sheets-Sheet 5

INVENTOR
Joseph Jandasek

Jan. 9, 1940.    J. JANDASEK    2,186,025
POWER TRANSMISSION
Original Filed Aug. 14, 1930    6 Sheets-Sheet 6

INVENTOR
Joseph Jandasek

Patented Jan. 9, 1940

2,186,025

UNITED STATES PATENT OFFICE 2,186,025

POWER TRANSMISSION

Joseph Jandasek, Cicero, Ill.

Application August 14, 1930, Serial No. 475,278
Renewed January 25, 1937

34 Claims. (Cl. 60—54)

This invention relates to a new apparatus for transmitting power from a primary or power generating member to a secondary or driven member in such a way that while heavy torque is produced in the secondary member, at low speeds of the secondary member, only part of the energy generated by the primary member is absorbed by the secondary member, and the remaining energy is returned to the primary member, producing an auxiliary torque acting in the direction of the rotation of the said primary member and in this way reducing the torque which is necessary for driving the said primary member. In other words, at overloads the function of the primary member is partly as a driving member and partly as a driven member. At high speeds of the secondary member, however, the function of the primary member is that of a generator only.

Energy is transmitted by means of energized fluid from the generating member to the motor, where at normal loads all of the said energy is consumed, but at overloads only part of the said energy is consumed, while a maximal torque is produced in the said motor and the remaining part of the said energy is transmitted back to the said generator by means of the said fluid returning ducts, which are designed in such a way that auxiliary torque is produced in the said generating member in a manner that helps to propel the generator. At low speeds of the motor the pressure energy of the circulating fluid is not consumed by the said motor and additional pressure energy is created from velocity energy of the fluid by the said motor, consequently the circulation increases at low speeds. At high speeds of the motor, however, pressure and velocity energy of the fluid are absorbed by the motor and consequently the circulation, i. e., quantity of the said fluid per second, decreases. Torque produced in the said motor increases directly with the quantity of the circulating fluid, hence at low speeds a heavy torque in the motor is created, while at high speeds a light torque is produced.

The main difference between the present idea and the idea described in my Patent No. 1,855,967 is: according to the present idea the increase of the torque is mostly due to the increased quantity of the circulating fluid, while the speed of the generator can be kept substantially constant. According to the previous idea increase of the torque was mostly due to the increased speed of the generator and more effective fluid energizing action of the said generator. It is apparent that an apparatus can be designed combining both ideas, so that the increase of the torque obtained would be due to the increase in the quantity of the circulating fluid as well as due to the increased speed of the generator and the more effective energizing action of the same. The previous idea also employed for overloads an auxiliary driven member, properly connected to the generator, while in the present idea the said auxiliary member is not used but the remaining part of the energy which was not consumed by the motor is absorbed directly by the generator itself.

To attain these and other objects I have interposed in my turbotransmission between the outlet from the turbine runner and the inlet of the pump impeller for adjustable guiding member (in Patent No. 1,855,967 the main set of redirecting vanes is nonadjustable).

Another object of my invention is to provide a new combination of the above mentioned turbotransmission with a reverse gear and to provide a practical and easy to operate method for controlling the said transmission and the reverse gear.

It is also an object of the invention to stop the circulation of the fluid, in order to prevent any drag between the impeller and the turbine runner so the reverse gear may be meshed without shock or slid out of mesh easily.

Other objects of my invention are: by turbotransmission is designed to be a completely enclosed and independent unit, fastened to the engine by a few bolts, each shaft of the transmission is supported by two bearings only, which assures perfect alignment of the bearings without expensive extra accuracy in the manufacturing. Reversing in my transmission is controlled by foot and the operator's hands are free. My transmission is made efficient by selecting the proper curvature and shape for the vanes, and by designing all fluid channels in a way that the energy can be returned to the pump and not be lost on its way. The pump and turbine are balanced hydraulically to do away with axial thrust.

Some of the many possible embodiments of the invention are illustrated in the accompanying drawings, each consisting basically of a driving and a driven member and guide vanes, in which—

My hydraulic transmission in all of its forms includes three parts, a pump mounted on a primary or driving shaft, a hydraulic motor mounted on a secondary or driven shaft, and stationary guiding passages interposed between the outlet of the motor and the inlet of the pump; all three of the said parts arranged in such relative positions that their passage systems form the circuit in which a fluid circulates.

The primary or secondary shafts may be arranged in any desired relative positions, the most important being coaxial.

Figures 1, 2, 3, 4:
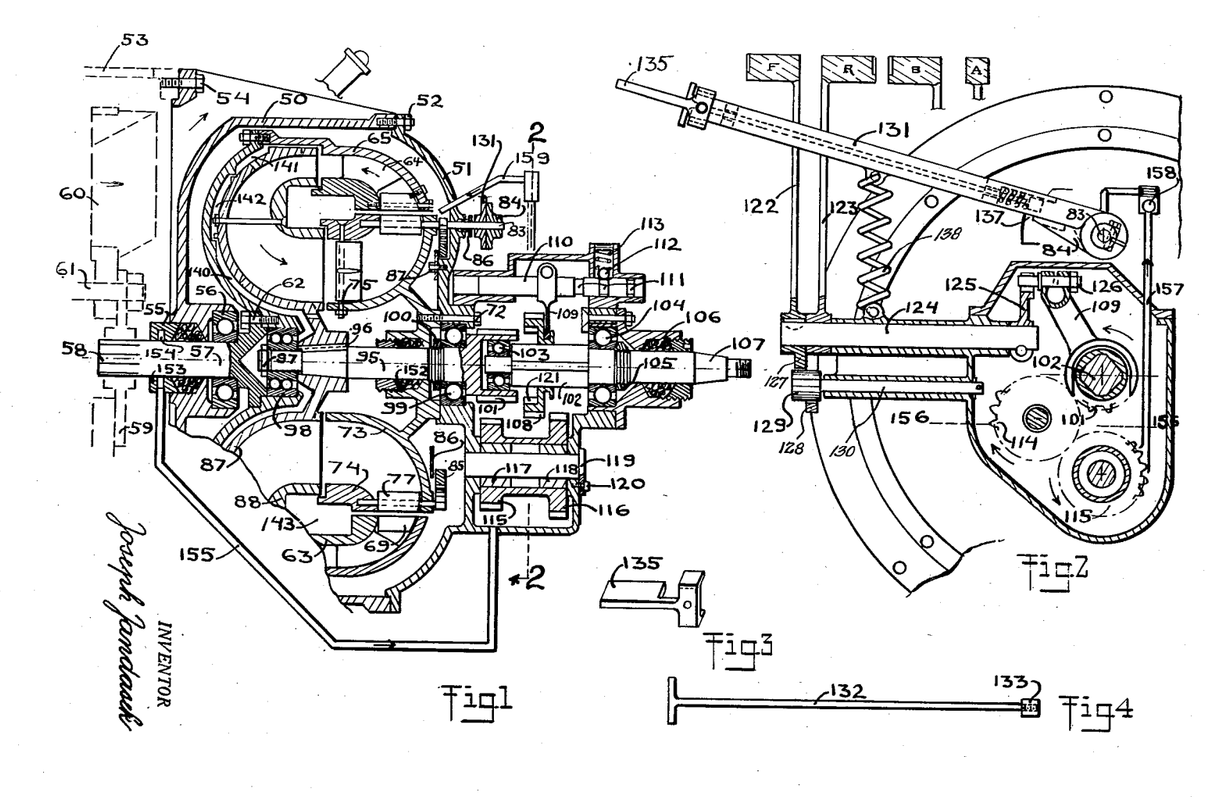
Figure 1 is a longitudinal section of a turbotransmission combined with reverse gear constructed in accordance with my invention.
Figure 2 is a vertical section of the transmission taken on line 2—2 of Figure 1, showing the arrangement of the gears and the operating pedals.
Figure 3 is a perspective view of a pad which operates a latch on guide vanes controlling lever.
Figure 4 is a latch assembly.
Figures 7, 8:
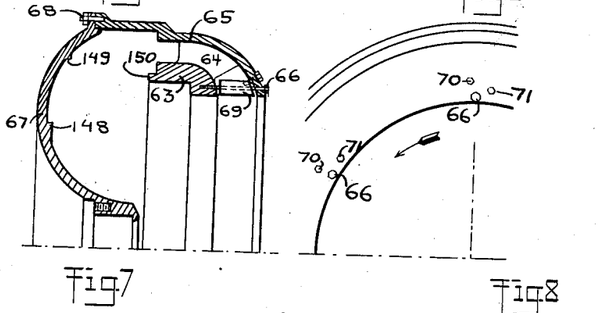
Figure 7 is a vertical section of one half part of the pump impeller assembly and Figure 8 is an elevational view of the same impeller.

The invention will be fully understood by referring to the accompanying drawings, forming a part of this specification, in which:

Figures 1 and 2 illustrate a form of my hydraulic apparatus equipped with a reverse gear and proper control, this apparatus being especially suitable for the propelling of vehicles. The numeral 50 indicates the main part of the fluid-tight stationary casing to which a cover 51 is fastened by bolts 52; casing 50 is rigidly secured to a fly-wheel housing 53 of a power engine by cap screws 54. The casing 50 is provided with stuffing-box 55 and with ball bearing 56 for driving shaft 57, which shaft is secured by means of a spline 58 to a flange 59; preferably this flange and the said shaft are so connected as to permit relative longitudinal movement, but prevent relative rotary movement, this is in order to facilitate manufacturing, assembling, and installation of the device. The flange is fastened to a fan shape flywheel 60 by means of bolts 61; the flywheel blows the air against the casing 50 in order to cool it. Mounted on the shaft 57 by bolts 62 is an impeller assembly, (see also Figures 7 and 8) consisting of: an impeller shroud 63 integral with fixed blades 64 (see also Figure 22 and 23), an impeller web 65 attached to the shroud by bolts 66, an impeller disc 67 fastened to the web by bolts 68, a set of semi-free vanes 69 rotatably mounted on bolts 66, pivoted at their leading edges, adjacent to the outlets from the guide vanes, and capable of adjusting themselves to the direction of discharge from the guide vanes; the inclination of the vanes 69 is limited on both sides by capscrews 70 and 71, which project into the impeller channel and serve as stops, (see also Figure 14).

Figures 9, 10, 12:
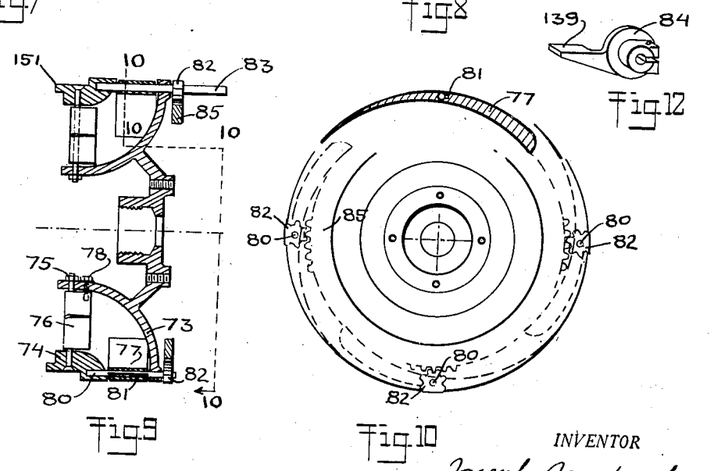
Figure 9 is a vertical section of the guide vanes assembly and Figure 10 is a section and view taken on line 10—10—10—10 of Figure 9 showing the same vanes assembly.
Figure 12 is a perspective view of lever clamped on guide vane pinion shaft.
Figure 11:
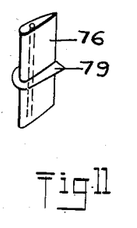
Figure 11 is a perspective view of a free vane used in guide vanes assembly.

Guide vanes assembly (see also Figures 9 and 10) rigidly attached to the cover 51 by bolts 72 includes: a guide vane web 73, a shroud 74 attached to the web by long bolts 75, each bolt carrying free vane 76 (for detail see Figure 11). These vanes 76 are pivoted at their leading edges, adjacent to the outlets from the runner blades, and adjust themselves to the direction of discharge from the runner, so that the fluid flows through the guide vane assembly without shock or impact to the discharge side of the said assembly, where it is delivered through adjustable vanes 77, to the primary element or pump. Screws 78, projecting into the guide vanes channel serve as stops and limit the movement of vanes 76 (see also Figure 15). The said vanes 76 are equipped with ribs 79 to increase their fluid guiding effectiveness. The eccentrically pivoted vanes 77 are rigidly connected to pins 80 by means by keys 81; each pin 80 is integral with a spur gear pinion 82, and is pivotedly supported at one end by shroud 74 and by web 73 at the other end; one of the said pins is equipped with a projection 83 and stuffing-box 86 in the cover 51, to which projection a lever 84 is rigidly clamped. (For detail see Figure 12.) The said projection also serves as a pivotal support for a latch lever assembly 131. (For detail see Figure 31.) All spur gear pinions 82 are in mesh with a ring spur gear 85 which is kept in position by a ring 86, said ring being bolted to the cover 51 by screws 87. All vanes 77 must rotate simultaneously around their axis because all the pinions are connected by the ring gear 85; every position of the ring gear corresponds to a certain position of all the guide vanes. It is to be noted that the centerline of the semi-free vanes 76, when at action, is not parallel to flow, angle A" in Fig. 15, left, but the vanes 76 are at an angle to the flow in the same way as an airplane wing possesses an angle of incidence. Without this angle the vanes 76 would not deflect the flow and would be useless. For this reason also the vanes 76 have a smoothly rounded entrance edge, being of a teardrop shape.

Figure 15:
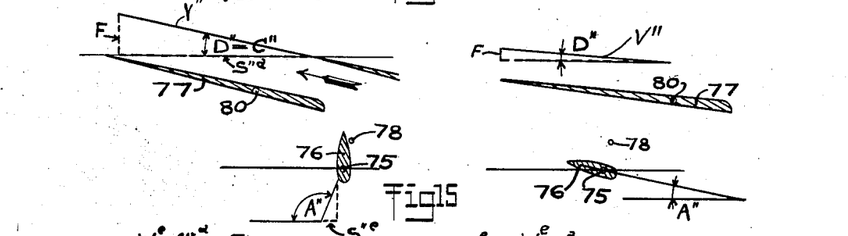
Figure 15 represents the profile of the guide vanes and their velocity diagrams.

In reference to gates: in order to relieve the impeller sufficiently at heavy loads, the discharge angle D" of the gates must be comparatively small: in order to force the fluid to follow this small angle, the actual length X of gates must be large in proportion to their radial height Z where radial height Z equals: $R''^d - R''^e$. Fig. 15 shows gates 77 having length X more than $3(R''^d - R''^e)$.

By the use of adjustable guide vanes 77, the driver of the vehicle can load up or unload the pump (consequently the engine), as much as it is necessary, because it is possible to change the directing angles and channel area of the guide vanes so that they correspond to a certain quantity of passing fluid; it is possible to stop the flow entirely in a similar way as it is accomplished on water turbines.

Figure 5:
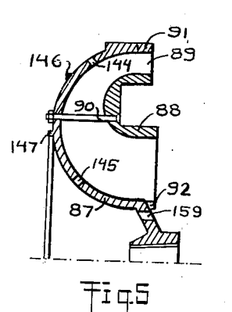
Figure 5 is a vertical section of one half part of the turbine runner assembly.
Figure 6:
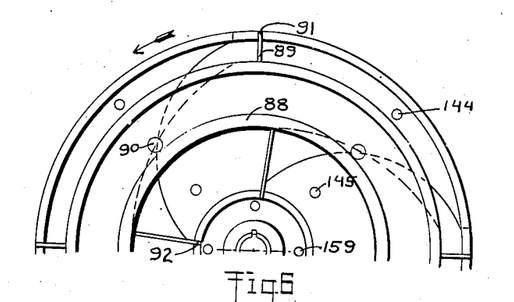
Figure 6 is an elevational view of the same runner.

The runner assembly (see also Figures 5 and 6) consists of: web 87, equipped with slots 91 at periphery and 92 at hub for vanes 89, shroud 88 and bolts 90, fastening the whole assembly together. Each vane 89 (see Figures 19, 20, 21) is provided with lug 93 to fit slot 91, and lug 94 to fit slot 92 in the web 87 for the purpose of securing the said vane rigidly in the correct location.

The runner assembly as a whole is secured to a secondary shaft 95 by means of key 96 and nut 97, or any other well known way, which shaft is supported by ball bearings 98 and 99, using nuts 97 and 100, and is integral with a spur gear 101.

The cover 51 serves also as a case for the reverse gear, which can be of any well known construction, but I prefer a sliding change gear type in which the gear is shifted by foot pedals of my own construction. A third shaft 102, is supported by ball bearings 103 and 104, the latter bearing secured by a nut 105, is carried through a stuffing box 106 in the case 51, and is provided with a taper fitting 107 for the attaching of a propeller shaft (not shown) for a vehicle drive. The shaft 102 carries a sliding gear 108 shifted axially by a fork 109 on shift rod 110 equipped with slots 111 and secured in the proper position by ball 112 and spring 113.

The gear 101 meshes with an idler gear 114 and this in turn meshes with a double gear 115 and 116 carried on roller bearings 117 and 118, which are supported by a large pin 119 secured in the case 51 by bolt 120.

The gear 108 is equipped with jaws 121 which mesh with the teeth of gear 101, if the said gear 108 is shifted axially for "direct drive"; or the teeth of gear 108 mesh with the teeth of gear 116 when gear 108 is shifted backward for "reverse drive."

Figure 29:
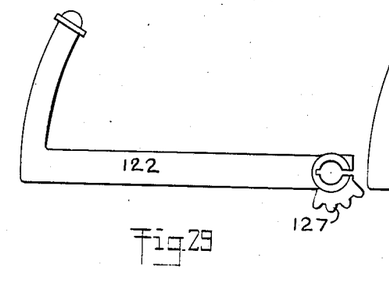
Figure 29 shows a side view of the "forward pedal" and Figure 30 is a side view of the "reverse pedal."
Figure 30:
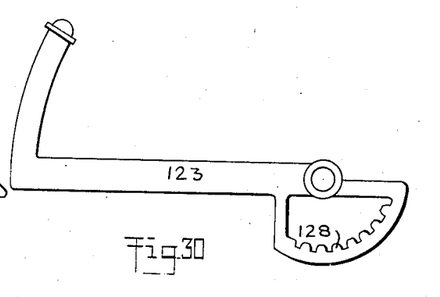

According to my invention shifting of the gear 108 is accomplished by means of two foot pedals: 122 (see also Figure 29) is marked "F" and is the "forward" pedal; reverse pedal 123 is marked "R" (see Figure 30). The pedal 122 is rigidly secured to a shaft 124 which is integral with a lever 125 operating a bolt 126 of the fork 109. The pedal 122 is integral with an external spur gear segment 127 and pedal 123 is integral with an internal spur gear segment 128, both segments 127 and 128 being in mesh with a spur gear pinion 129 integral with a freely rotatable shaft 130. In this way, when pedal 122 is pressed forward, the pedal 123 rotates backwards, and lever 125, fork 109, and gear 108 move forward and vice versa, when the operator steps on pedal 123 the gear 108 is shifted into "reverse." In Figure 2 I have also illustrated the relative position of these pedals to a brake pedal marked "B" and to an accelerator pedal marked "A" of an automobile. Shifting pedals F an R are to be operated by the left foot and brake B and accelerator A pedals are to be operated by the right foot; in this way the hands of the operator are free from shifting work which is especially important in the case of motor busses.

Control of the guide vanes is accomplished by a latch lever 131 (see also Figure 31), levers 131 and 84 turn about pin 83 as a common pivot axis. Ordinarily a tension spring 138 pulls lever 131 down until it presses upon a lug 139 of the lever 84. In this way the spring 138 closes guide vanes 77 against the pressure of the fluid in the guide vanes channel. Whenever the pressure of the fluid overcomes the tension of the spring 138 vanes 77 open automatically and vice versa. When the operator presses down lever 135 (Figure 3) he pulls a latch rod 132, compresses the spring 134, and presses down lever 131 which in turn presses upon lever 84, which finally closes vanes 77 with the effect of unloading the pump and speeding up the engine. If the operator presses on the latch lever very hard he can close the fluid circuit entirely; which enables the shifting in reverse without the need of any clutch.

For the control of the guide vanes for large power transmissions a servomotor of similar construction as that used on turbines could be employed.

Because of the friction and the efficiency of the drive on long nonstop trips it is a great advantage to eliminate the action of guide vanes 77. Without guide vanes my torque converting device becomes a mere hydraulic clutch mechanism where the torque on the third shaft is at all times the same as that of the primary shaft which gives all the advantages of "direct drive", being a very economical device. At high speeds the fluid needs but little retardation of the driven member to develop the required driving torque, hence the lag or "slip" between the driving and driven members is insignificant, about 2 or 3%.

This elimination of guide vanes is accomplished by pulling up the lever 135 and 131 until the latch 133 catches the lug 137 of the case 51, and holds the lever 131 in its "up" position. In that way lever 131 does not press upon lever 84 and eccentrically pivoted guide vanes are free to adjust themselves to the rate and direction of discharge from the turbine so that the fluid flows through the said guide vanes without shock or impact.

Whenever the operator feels that additional torque might be required, he steps on the lever 135, pulls the latch 133 from engagement with the lug 137, and a tension spring pulls lever 131 down, which presses upon lever 84 and this turns guide vanes 77; in this way additional torque can be created and my device becomes a torque converter again.

With reference to the velocity diagrams, well known from textbooks on turbines and centrifugal pumps (see Figures 13, 14, 15), the following notations will be employed:

For the impeller:

$f$—Velocity of flow (radial).
$v$—Absolute velocity of fluid.
$w$—Velocity of fluid relative to the impeller.
$u$—Linear velocity of a point of the impeller.
$r$—Radius to any point of the impeller from the axis of rotation.
$a$—Angle between $v$ and $u$ at entrance.
$b$—Angle between $w$ and $u$ at entrance.
$c$—Angle between $w$ and $u$ at discharge.
$d$—Angle between $v$ and $u$ at discharge.
$s$—Tangential component of $v$, which equals $v \cos a$ at entrance or $v \cos d$ at discharge.
$L$—Area of flow normal to $f$.
$q$—Pounds of fluid flowing per second.
$h$—Head of fluid imparted.
$t$—Torque exerted.
$n$—Revolutions per minute.
$g$—Acceleration of gravity.
$e$—Energy imparted by impeller.

For the runner same notation will be used but in capital letters: F, V, W, etc.

For the guide vanes capital letters with a superscript (") thus F", V", etc., however, it must be remembered that linear velocity U" equals zero.

The superscript ($^e$) will refer to the stream at entrance and the superscript ($^d$) at discharge.

Figure 14:
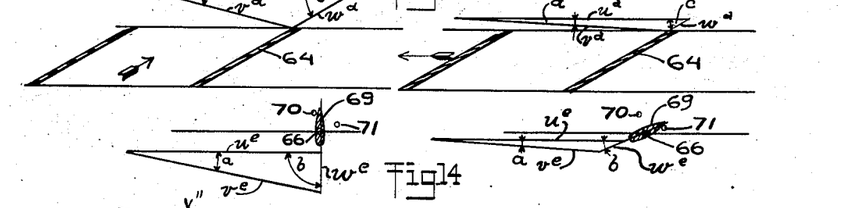
Figure 14 shows impeller vanes and velocity diagrams, again the left diagrams are for heavy loads and right for light loads.

In reference to the fixed impeller vanes 84, see Figure 14, I prefer back curved vanes because they help the impeller to keep its speed at heavy loads as will be shown later. Floating vanes 69 serve as driving vanes at light loads and high speeds (see Figure 14, right) the velocity of the incoming fluid being less than the rotating speed of vanes 69. At heavy loads, however, the fluid velocity becomes greater than the rotative speed of vanes 69 and the said vanes become driven vanes (see Figure 14, left) and that is the reason why stops 70 and 71 were provided.

Figures 32, 33, 34, 35, 36, 37:
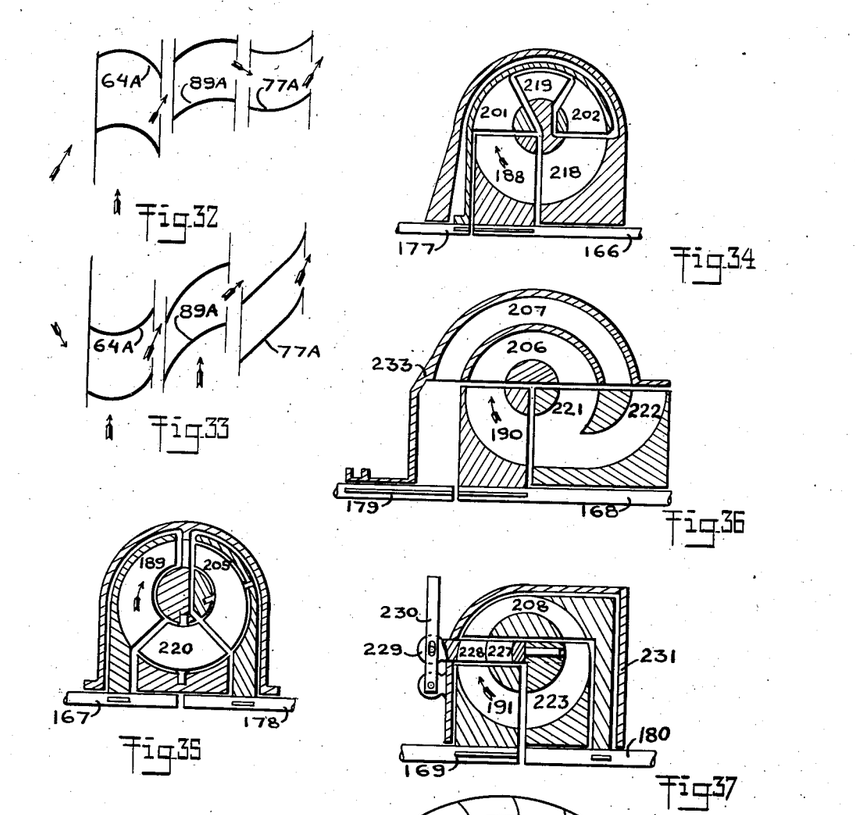
Figure 32 is a diagrammatic development illustrating the ideal curvature of the vanes and the direction of the fluid flow at overloads.
Figure 33 shows the shape of the same vanes and the direction of the fluid flow at normal loads.
Figure 34 is a sectional view showing a form of my device equipped with a two stage turbine rotor.
Figure 35 is a diagrammatic sectional view representing a form where not only the guide vanes but the runner vanes are pivotedly mounted to their webs and shrouds.
Figure 36 is a sectional view illustrating a device in which the turbine rotor has two sets of passages to either of which the liquid may be guided by shifting the rotor axially.
Figure 37 represents diagrammatically my apparatus equipped with an axially shiftable, not rotatable, guide wheel interposed between the outlet of the impeller and the inlet of the runner, for the purpose of "reversing."

The ideal shape of the impeller vanes is shown in Figure 32 for heavy loads and in Figure 33 for light loads. Numeral 64A shows the actual profile of the flexible blades. Notice that the entrance edge at heavy loads is curved forward, but at light loads is curved backward due to the motion of the fluid relatively to the impeller after discharge from the guide vanes. At heavy loads the function of the impeller is partly as the action of a reaction turbine.

Numeral 89A indicates the ideal flexible runner vanes and numeral 77A shows the ideal flexible guide vanes; notice that the entrance edge of vanes 77A is curved backward at heavy loads, but is curved forward at light loads.

In reference to the runner vanes 89, they are more similar to the stationary guide vanes as used on the so-called "turbine pump" for changing the water velocity into pressure, and are dissimilar to vanes as used today on the reaction type of water turbines.

Figure 13:
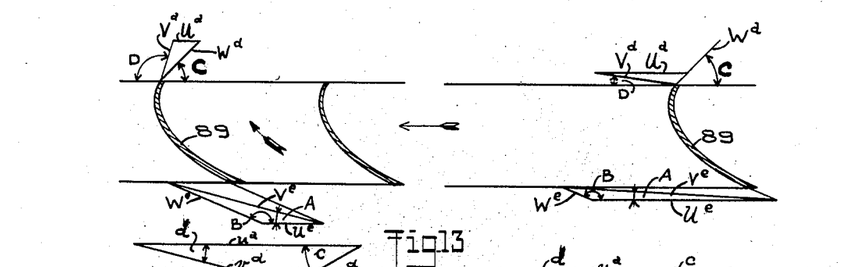
Figure 13 illustrates the curvature of the runner vanes as well as fluid velocity diagrams, left diagrams are for overloads, right diagrams for light loads.
Figure 20:
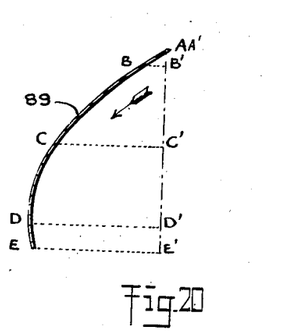
Figure 20 is a section through the runner vane taken on line A, B, C, D, E of Figure 19 and showing the actual curvature of the runner vane.
Figure 21:
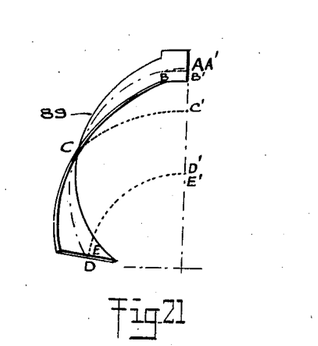
Figure 21 is a view of the same vane showing the actual projections.

The runner vanes in my device are divergent, see Figures 13, 20, 21, while on all known turbines of today, the vanes must be convergent in order to make use of available fluid pressure, and to absorb fluid energy. In my device the fluid pressure behind the runner is greater than the fluid pressure in the circuit before the runner. This is especially true at low speeds when the circumferential component of the fluid is great. In all reaction turbines, the fluid pressure after the runner is smaller than before the runner and on all "action" or impulse turbines the pressure after the runner equals the pressure before the runner. The discharging angle of my runner vanes is larger than the entrance angle because the runner vanes are similar to stationary guide vanes as used on turbine pumps, for changing fluid velocity into pressure. These guide vanes always have the discharge angle larger than the entrance angle. If this were not so, such guide vanes would be useless. In all known turbines the discharging vane angle is smaller than the entrance angle for obvious reasons.

The discharging angle of my runner vanes (Figure 20) measures about 75°, while the largest discharge angle on all known economical turbines never exceeds 30°. The area of flow $L^e$ normal to velocity $W^e$, relative to the runner, is smaller at the entrance than the area of flow $L^d$ normal to velocity $W^d$ at the discharge. The relative velocity of flow $W^d$ is also smaller than $W^e$, consequently the discharging angle of my turbine runner is greater than discharging angle of all known turbines.

The increase of pressure due to flow between the runner blades of my device can be calculated according to the following formula, taken from Gibson's "Hyradulics and its Applications", third edition, page 508.

$$P'/k = (W^{d2} - W^{e2})/2g \qquad (11)$$

where $P'$ is the increase in fluid pressure in the runner due to the vanes diverging and $K$ is weight of fluid per cubic foot.

Figures 16, 17, 18:
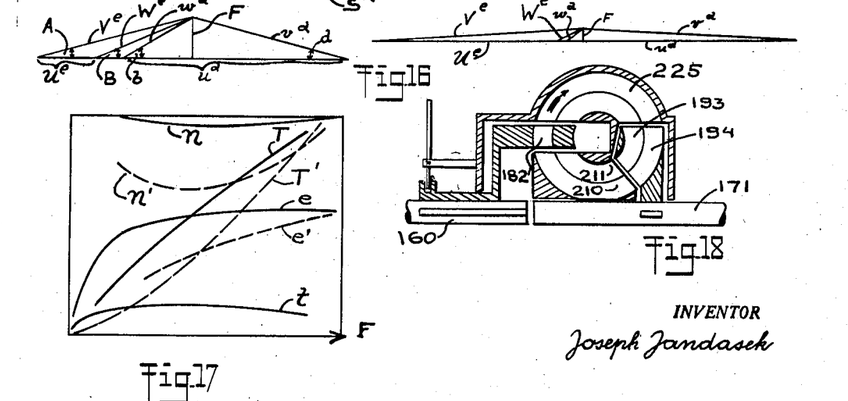
Figure 16 illustrates combined velocity diagram for the impeller discharge and for the runner entrance at heavy and at light loads.
Figure 17 is a diagram showing the speed, horsepowers and torque of the impeller and turbine runner.
Figure 18 illustrates diagrammatically an arrangement of a reversible device equipped with one impeller, but two sets of runner vanes and two sets of guide vanes.

Since the relative velocity of fluid $W^d$ is smaller than $W^e$, the blades of the turbine cause an increase in pressure, rather than a decrease, as is the case in all known reaction turbines. The design of divergent runner vanes (Figure 13, left, and Figure 20) is necessary for returning energy from the runner to the impeller, because the pressure P' forces the fluid through the guide vanes at such velocity as to unload the impeller and to retain the speed practically constant at all loads (Figure 17).

To increase the efficiency I select the divergency of each runner vane relative to the next adjacent vane smaller than 30° at any point on the vane, even at the outlet where the divergency is largest.

In reference to the term "divergency", it must be remembered that any fluid channel is divergent wherever the velocity of the fluid flow $W^d$ at the end of the channel is smaller than the velocity of the liquid flow $W^e$ at the entrance of the channel. The same volume of liquid must flow through the channel at the entrance as well as at the exit or at any point between the entrance and the exit of the channel. The volume of the liquid flowing is equal to its velocity W, times the area of the channel L, which area is perpendicular to the flow. Then $W^e L^e = W^d L^d$. If the discharging velocity $W^d$ is smaller than entrance velocity $W^e$, the channel area $L^d$ must be larger than $L^e$. Whenever the discharge area $L^d$ of a channel is greater than the entrance area $L^e$, that channel is referred to as being divergent with respect to area. The channel area consists of two dimensions, that is, width and depth. Since width times depth equals area, the channel can be divergent when—A, both dimensions are divergent; B. when one dimension is divergent and the other dimension is neutral or parallel; or, C, when one dimension is convergent and the other dimension is divergent, but the divergent dimension is such as to more than offset convergent dimension. It thus appears that a fluid channel can be divergent in respect to area even if the channel is convergent in respect to one dimension.

In Figure 13 I have illustrated the increasing curvature and increasing divergency of the runner vanes. The width of the channel at the entrance equals the pitch×sin B, while at the discharge the width of the channel equals the pitch ×sin C. As illustrated in Figures 13 and 20, the angle C is more than twice the angle B. The width of the channel at the discharge must therefore be greater than the width of the channel at the inlet. Expressed in a different way, a channel in a radial turbine is divergent with respect to width when the discharge angle is greater than inlet angle, and is convergent with respect to width when the discharge angle is smaller than inlet angle. The discharging velocity $W^d$ is less than entrance velocity $W^e$ when the fluid channel is divergent with respect to area, and vice versa.

Divergency of a channel at any point between the inlet and the exit is measured by the angle of the channel walls at that point, or by the increase of the channel area per unit length of the channel. This angle of the channel wall divergency must not be more than 30° at any point, and should be smaller, especially for high fluid velocities. The curvature of the vanes should also be gradual or small for high velocities, but can be progressively increased as the velocity decreases.

This new method of designing turbine vanes divergently rather than convergently, with the inlet angle smaller than the outlet angle, is one of the important features of the present invention, because in practice only one, or at the most two, sets of semi-free vanes 76 can be used because there is insufficient space. The entrance angles of the semi-free vanes on the guide wheel cannot therefore be correct for all fluid discharge angles of the runner but must be a compromise.

According to my method, the changes of the fluid discharge angles at the turbine outlet can be decreased, and only a limited number of semi-free vanes employed while the shock losses are minimized.

For example:

A. Assume that for high speed the divergent turbine vanes have an angle of discharge C=80° and angle D=15°. When starting, angle D equals 180−80 (U=0). Then the total change of the angle D from start to high speed will equal (180−80)−15=85°.

B. At high speed a reaction turbine has a discharge angle C=15° and angle D=15°. When starting, (U=0) angle D=180−15, and total change of angle D from the start to high speed equals (180−15)−15=150°, which is almost double that of the divergent vanes in Example A.

The smaller the discharge angle differences the smaller will be the differences of fluid entrance angle A" (Figure 15), and the smaller the shock losses. Consequently, divergent turbine vanes are more economical for turbine transmission with variable speed than customary convergent vanes. It will be understood, of course, that the discharge angle can be varied as required for various designs. For literature on reaction or impulse turbines, see, for instance, Gibson's "Hydraulics and its Applications", pages 441–454, 456–462, 467–478, and 500–520.

At overloads only part of the fluid energy is consumed in the turbine and the remainder of the energy is transmitted to the guide vanes, and from the guide vanes back to the impeller. This is the chief reason that I employ vanes having discharge angles greater than 45° (Figures 13 and 20); vanes having the discharge angle larger than the intake angle; divergent vanes having the angle of vane divergence small at points of high fluid velocities, but with the angle of vane divergence greater at points of lower velocities; vanes having small curvature at inlet, but with larger curvature at outlet, and in the shape of a parabola. At low speeds the pressure energy of the fluid is not consumed by the turbine and additional pressure energy is created from the velocity energy of the fluid by the turbine vanes having discharge angles greater than 45° and greater than the inlet angle. This fluid pressure forces the fluid through the guide vanes in the same way that fluid pressure forces water through the gates of a hydraulic turbine at such velocity as to transmit fluid energy not absorbed by the runner back to the impeller, and in that way unload the impeller.

Redirecting guide vanes must, however, be interposed between the runner discharge and the impeller entrance to prevent the fluid from entering into the impeller in the opposite direction and thereby overload the impeller. The fluid pressure causes the floating vanes 69 to act as driven vanes at heavy loads (Figure 14, left), because the fluid velocity entering the impeller becomes greater than the speed of vanes 69. Due to the pressure increase combined with the force exerted by the redirecting vanes located between runner outlet and impeller inlet, the action at the entrance of the impeller is similar to the action of a turbine at low speeds. That is why the runner vanes 89 are similar in shape and function to the stationary guide vanes as used on turbine pumps, for changing fluid velocity into pressure.

The ordinary water turbine vane angle at entrance is larger, the vane angle at exit is small, because the energy of the discharged water should be as small as possible. In my device, however, at overloads the fluid energy is not absorbed entirely in the runner and therefore must be transferred back to the pump. If redirecting vanes could be made perfectly flexible and have correct angles at all speeds (see Figures 32, 33) the exit angles of the runner vanes could be small. As, however, the vanes are not flexible there would be a great loss at heavy loads, where the fluid discharging from the turbine would stream backward and strike against the guide vanes at a wrong angle. It is better in my device to change a great part of the velocity energy into pressure energy and thus avoid shock losses due to wrong vane angles. Therefore, I prefer runner vanes with a small entrance angle and with a large exit angle (see Figure 20, which illustrates a vane with entrance angle smaller than 45° and with discharge angle about 75°); in order to make this change of velocity into pressure as economical as possible vanes 89 have a large radius of curvature (small curvature) at the entrance, but a small radius of curvature (large curvature) at the exit, so the angle of vane divergence is small at points of high fluid velocities; at points of low fluid velocities, the angle of vane divergence can be greater and the efficiency of the velocity to pressure change is not effected much, because internal friction losses are in proportion to the square of the fluid velocity. That is why I have designed my turbine vane with increasing curvature, in the shape of a parabola. Also, according to the multi-dimensional theory, the natural flowing process follows a path in the form of a parabola when changing its direction in the runner.

Figure 19:
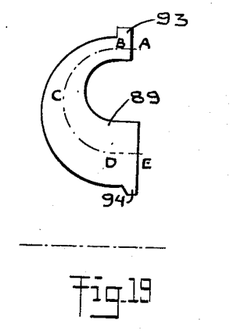
Figure 19 is an elevation view showing runner vane as it would be if it were rotated about the axis until it lay in the plane of the paper, and does not show actual projections.

Figure 19 is an elevation view showing the runner vane 89 as it would be if it were rotated about the axis until it lay in the plane of the paper. In Figure 20 is illustrated a section through the runner vane 89 taken on line A, B, C, D, E of Figure 19 and shows how the radius of curvature decreases toward the exit point E; points A, B, C, D, E were all lying on a parabolic curve, when the diameter of the runner was infinitely large. In Figure 21 is drawn a view of the same vane showing the actual projections of the vane for the runner diameter of finite size. Abscissas BB′, CC′, DD′, EE′, in Figure 20 are equal to corresponding arcs BB′, CC′, DD′, EE′, in Figure 21. It is also important that the discharge from the runner is axial and of the smallest possible diameter so the angle of the outcoming fluid flow varies only little at different speeds, in order to eliminate shock losses in the guide vanes. In operation, refer to Figs. 13, 14, 15, when the working fluid enters the runner vanes, its velocity has a powerful circumferential component and an axial component; but, at high speeds, the runner vanes are working at full capacity and they extract all the energy of the fluid which was imparted by the impeller vanes, and the fluid leaves the runner vanes with a velocity which has a diminished circumferential component in the direction of runner rotation, and, of course, an axial component. The fluid now passes through the guide vanes which do not substantially alter the direction of flow so that the fluid when leaving the guide vanes and returning to the impeller vanes possesses a velocity which has the same circumferential component as the velocity at the runner discharge; in other words the guide vanes do not function.

At very low speeds or when starting, however, the runner vanes are not extracting all the energy of the fluid which was imparted by the impeller vanes, and the fluid leaves the runner vanes with a velocity which has, substantially, an axial component only but possesses a great pressure energy, which was created from velocity energy of the fluid by the diverging runner vanes, said runner vanes having a discharge angle about 75°, as shown in Figure 20, or only slightly curved. The fluid now passes through the guide vanes which alter the direction of the flow and change the fluid pressure energy into kinetic energy, so that the fluid when leaving the main guide vanes and returning to the impeller vanes possesses a velocity which has again a powerful circumferential component. The value of this circumferential velocity component can be adjusted or changed either manually or automatically, as described, so the device can possess both: high gearing ratio for overloads as well as high efficiency for normal load.

From the above it can be seen that the gist of my invention consists broadly in the provision of certain efficient means in a fluid power transmission comprising driving, driven and stationary vanes, to transform the fluid energy which was not absorbed by the driven vanes into pressure energy and to change said fluid pressure energy by the stationary vanes back into velocity energy applicable directly to the rotation of the driving vanes. Entrance angles of the driving and stationary vanes are automatically altered and corrected under the control of the fluid.

It can be proved mathematically that in a turbine transmission with a fixed entrance angle of impeller vanes, the fluid will stream perpendicularly to impeller vanes when leaving guide vanes, and therefore all returning energy is lost by shock due to this wrong entrance angle; in other words, in fluid transmission with rigid impeller vanes at certain speeds no energy can be returned to the driving vanes by means of circulating fluid due to improper guidance of the fluid. Therefore fluid alone, not energized, is returned to the driving vanes in such transmissions. In this invention, however, entrance angle of the impeller vanes automaticaly is corrected so the energy can be returned at all speeds and loads.

As known from textbooks on hydraulics (see textbook Gibson's Hydraulics and its Applications, third edition, pages 500–503, 629–632, D. Van Nostrand Co.):

Torque exerted by impeller equals:

$$t = (q/g)(r^d s^d - r^e s^e) \qquad (1)$$

Power imparted by impeller equals:

$$e = (q/g)(u^d s^d - u^e s^e) \qquad (2)$$

Turning moment of the runner equals:

$$T = (Q/g)(R^d S^d - R^e S^e) \qquad (3)$$

Power of runner equals:

$$E = (Q/g)(U^d S^d - U^e S^e) \qquad (4)$$

Turning moment of guide vanes reaction:

$$T'' = (Q/g)(R''^d S''^d - R''^e S''^e) \qquad (5)$$

As there is no other source of power or of turning moment in our fluid system, it is evident that:

$$t + T + T'' = 0 \quad (6)$$

and $$e + E = 0 \quad (7)$$

Torque of engine $t$ is almost constant within our operating limits. At low speed $S''^e$ is very small, due to angle $D$ being large (see Figures 13 and 15), and can be neglected, further; $A'' = D$ and $F = f$.

$$S''^d = f \, ctg \, D'' \quad (8)$$

see Figure 15, and;

$$Q = f L'' \quad (9)$$

Substituting these values in Equation (6) we get:

$$T = -t - f^2 L'' R''^d \, ctg \, D''/g \quad (10)$$

and we can say that, at heavy loads, turning moment of turbine $T$ increases with the square of flow velocity $f$ ($L''$ and $D''$ being of a fixed value.) It also shows that $T$ increases with $ctg \, D''$ in other words at smaller angle $D''$, greater torque $T$ can be developed.

When angle $D''$ is selected too small, engine is not loaded enough for normal loads and rotates very fast which results in bad wear and tear of the engine (too much energy is being returned to primary member).

Also, when angle $D''$ is selected small, the velocity of discharge from guide vanes $V''$ will be high and great losses due to friction will occur (Fig. 15).

At the large value of angle $D''$, however, transmission will be very efficient, but only reasonable gear ratio of the transmission can be developed (not much energy is returned to primary member). For this reason I have designed adjustable guide vanes or gates in my device, so as to obtain efficient apparatus and still obtain large gear ratio. Discharging vane angle $C''$ of guide vanes equals angle $D''$ and is variable, see Fig. 15; but this angle must be selected reasonably small, less than 45° so sufficiently great angular momentum could be imparted to the fluid; in the other case, when angle $C''$ is too large, the impeller and of course the engine will slow down too much and stall at heavy loads.

When latch lever 131 is lifted guide vanes 77 become free and their function is eliminated; in this case $T'' = 0$, consequently: $t + T = 0$ (6A), in other words, the torque of the impeller is as great as that of the runner.

I have also curved the discharging impeller vane tips backward (see Figure 14) and the entrance runner vane tips forward. Explanation for this can be obtained by studying Figure 16.

In Figure 16 I have drawn a combined velocity diagram for discharge of impeller and for entrance of runner at heavy loads (flow velocity F is great). As there are no guide vanes between impeller and runner it must be: $v^d = V^e$, and angle $d = A$.

We can see now that for correct angles $A$, $a$ and vane angles $b$, $B$, linear velocity of runner $U^e$ must be relatively small to the velocity of the impeller $u^d$ and that is just what is required for a torque converter. At heavy loads the impeller rotates at a much faster speed than the runner.

In the same Figure 16 I have drawn a similar velocity diagram for a light load (value of F is small) at right side. Here we can see that the effect of the curving vanes, angles $b$ or $B$, is negligible for small values of $F$ and correct velocities $u^d$ and $U^e$ differ only little, which again is what is wanted for a torque converter. In other words at light loads the runner rotates almost as fast as the impeller.

At different loads the runner and the impeller rotate at different speeds and still impinging angles of the fluid flow as well as the vane angles are correct, i. e., my transmission works efficiently at heavy as well as at light loads.

In Figure 17 I have illustrated graphically the advantages of adjustable guide vanes as compared to fixed vanes which are described in my Patent No. 1,855,967. Full line curves are for automatically adjustable guide vanes, and dotted line curves are for fixed vanes. Curve $n$ represents the value of the speed of the impeller (R. P. M.) as the flow velocity F increases for automatically adjustable vanes. Dotted curve $n'$ illustrates the values of the impeller speed for fixed vanes. It is apparent that at lighter loads (F is small) the speed of the impeller $n'$ (or engine) is considerably lower than at heavy loads (F large). In other words, when the fixed guide vanes are used at lighter loads the engine develops less horsepower $e'$ which results in smaller torque $T'$ as compared to when adjustable guide vanes are used. In order to obtain a "constant characteristic" of the device, i. e., where the speed of the impeller is practically constant (see curve $n$ in Figure 17), the discharge angle $D''$ of the guide vanes must be larger initially than the discharge angle of the device illustrated in my Patent No. 1,855,967. In the device illustrated in the present application the impeller speed at the start is greater, and the angle $D''$ must be smaller than the corresponding angle of the device illustrated in my copending application Serial No. 588,163, so the impeller speed at the start is greater in the device illustrated in the present application.

As the turbine speed increases, this angle must decrease by the amount $E_r$ which is the angle measuring the amount of change or adjustability in the discharge angle $D''$ of the pivoted guide vanes, but the discharge angle must diminish slower than in the device illustrated in my copending application Serial No. 588,163, with a rising characteristic. The impeller speed will therefore remain constant, instead of being variable, i. e., a decrease of the discharge angle $D''$ for the device with a "constant characteristic" must be smaller than the decrease of same angle for a device with a "rising characteristic". This is obtained by proportioning the strength of spring 138 in proper relation to power of the flow out of the gates.

This turbotransmission of itself does not provide a reverse motion; for the latter purpose a reverse gear is used.

Another very important item is the problem of balancing axial thrusts. No turbine or turbopump is practical unless the axial thrust is balanced because enormous pressure can be produced in the bearings which would endanger their life, and decrease the reliability of the device.

In Figure 1 we can readily see that the side pressures of the fluid against the runner assembly would not be equal, due to the fact that entrance and discharge channels take part of the area on the right side of the web and consequently the total pressure on the right hand side is diminished. The left hand side of the runner, however, is completely under pressure, spaces 140, 141, 142. Hence the pressure against the runner assembly is acting on a smaller area, portion 143, from the right, but acts on the larger area from the left, portions 140, 141, 142. The result is that the unbalanced force tends to shift the runner toward the right. To prevent this tendency, a number of holes 144, 145, and 159 (see Figures 5 and 6), are drilled in the runner web to equalize the pressures on the right and left sides of the runner.

In order to decrease short circuit losses through openings 144, 145, and 159 and through portion 143, clearance rings 146, 147 on runner web 87, and clearance rings 148 149, 150 on the impeller (Figure 7) and clearance ring 151 on the guide vane assembly (Figure 9) are provided.

The casing 50 is completely filled with a fluid, this may preferably be oil. Leakage is prevented by stuffing-boxes 55 and 152. From the standpoint of efficient operation as well as commercially the presence of a predetermined amount of fluid in the casing is imperative. However, high pressure under heavy load, centrifugal force at high speeds, natural wear, poor packing or other sealing means around both shafts and other factors, tend to cause leakage from the casing. I have eliminated any stuffing-boxes of large diameters around the sleeves, which are hard to keep tight due to the high periphery speed. Commercially such a leakage can be a sufficient reason for the failure of the whole machine. I have provided a simple, automatically acting means for delivering the liquid to the casing at all times during normal operation.

In order to prevent any leakage loss of oil the stuffing-box gland 153 is provided with an oil collecting groove 154 to which is connected an oil drain pipe 155. The other end of pipe 155 runs into the gear case 51. Oil level in the gear case is kept to a horizontal line 156—156 which is located under the centerline of the shaft. Any oil which passes the packing in the stuffing-box 55 is drained into the gear case 51. The gear case 51 is also used as a reserve tank for the fluid which is used in the transmitter.

The mechanism which delivers fluid to the casing 50 from gear case 51 consists of; pipe 157, check valve 158 and pipe 159 projecting into the casing 51, at a point of comparatively small pressure, i. e., at the periphery of the guide vane web 73. The lower opening of pipe 157 is located right at the periphery of the constantly revolving gear 115; oil is driven into the pipe by the teeth of the said gear. The liquid will not escape from the case 50 through pipe 157 when the transmission is at rest, as the pipe 157 is closed by a check valve 158.

Finally, I have designed my transmission so it would be an easy manufacturing proposition; for instance, each shaft 57, 95, and 102 is supported by two bearings only so as to keep them easily in line. The transmission as an independent unit is easily attached to the engine flywheel housing with a single spline 58 entering into the flange 59. My turbotransmission enables the automotive vehicle to be started by merely depressing the accelerator pedal A (Figure 2). Standing on a level, with the engine running at idling speed, the vehicle may have brakes off and yet it will not move, because the energizing of the fluid by the impeller at very low engine speeds is negligible. As the engine is speeded up, the fluid energizing becomes more effective and the vehicle begins to move with exceedingly smooth starting, without any jerks, because there is no rigid connection between the vehicle drive and the engine, there is also no clutch to shift.

All forward speeds of the car are controlled by the accelerator pedal only. The change of gear ratio (i e., the increase of torque) is automatic, since the increase of the loading at the road wheels slows the transmission and the runner moves mor slowly in relation to the impeller. The transmission, of course, can be stalled by overload, but the engine cannot thus be stopped; therefore the engine is protected from overloading at all times. At idling speed the impeller does not pump sufficient fluid into the runner to drive the vehicle. The vehicle commences to move as the accelerator is opened.

In Figures 18, 24, 25, 26, 27, 28, 34, 35, 36, 37, 38, 39, the numerals 160 up to 170 inclusive indicate the primary or driving shafts, which are connected to the power engines or other sources of energy (not shown). The numerals 171-181 inclusive indicate the secondary or driven shafts, numerals 182-192 inclusive indicate primary or driving blades and wheels mounted and secured to the primary shafts, numerals 193-202 inclusive and 205-209 inclusive the secondary or driven blades and wheels mounted and secured to the secondary shafts, numerals 210-224 inclusive, the third non-revolving redirecting guide blades and wheels; numerals 225-227 inclusive indicate stationary reversing vanes.

Figures 38, 39:
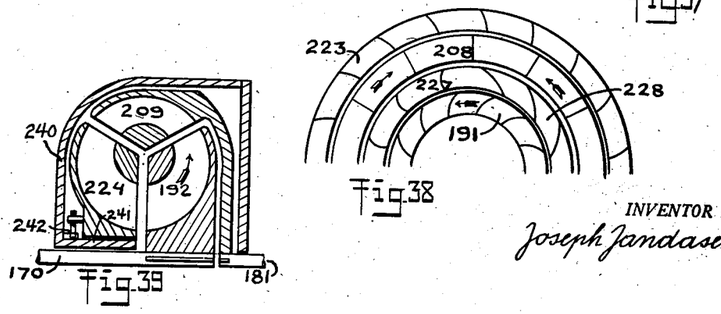
Figure 38 is a diagrammatic view showing: on the right hand side the curvature of the vanes through which the operative medium flows in the circuit formed when the guide wheel of Figure 37 is in location for "forward", on the left hand side showing the curvature of the vanes through which the operative medium flows in the circuit formed when the guide wheel of Figure 37 is shifted to location for "reverse."
In Figure 39 I have illustrated a form similar to that shown in Figure 25, but guide vanes are free to rotate in the direction of the pump rotation.

In Figure 37 the numerals 227 and 228 indicate axially shiftable, but not rotatable, guide vanes, 227 for "reverse" drive and 228 for "forward" drive. Guide annulus 229 integral with vanes 227 and 228 can be shifted by means of lever 230 pivotally secured to a casing 231, thereby bringing either of the vanes 227 or 228 into operation. The curvatures of the blades are indicated in Figure 38; it will be noticed that vanes 228 can be omitted as the fluid has correct direction for "forward" drive when discharged from vanes 191.

Figures 22, 23, 24, 25, 26, 27:
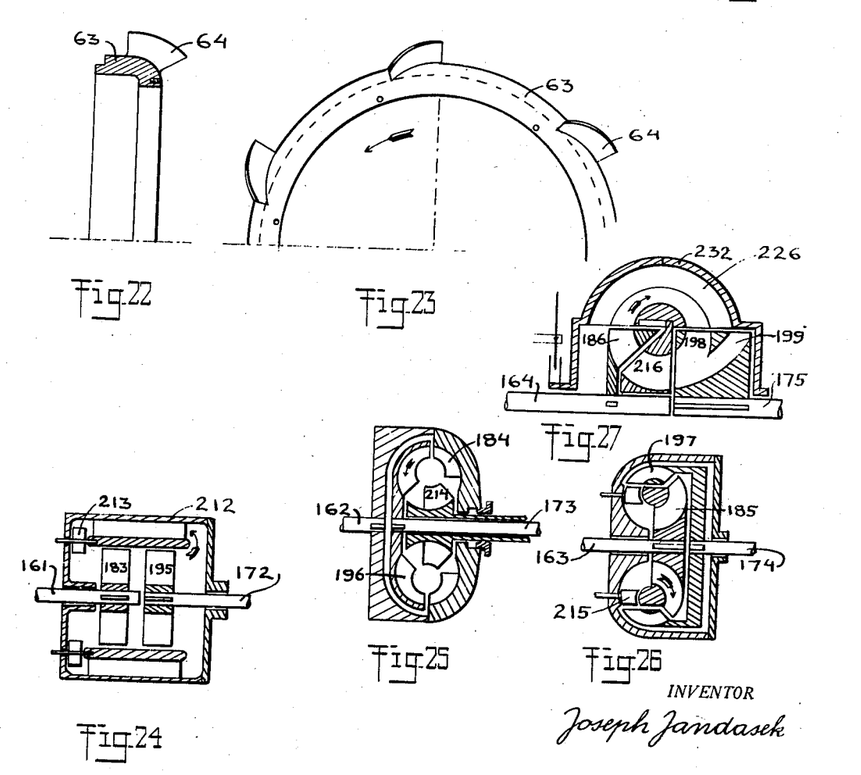
Figure 22 is a vertical section of one half part of the pump impeller.
Figure 23 is a side view of Figure 22.
Figure 24 illustrates another form of turbo-transmission designed according to my idea where the propeller type of impeller and runner are used.
Figure 25 is a sectional view diagrammatically illustrating a form of my apparatus where the impeller serves as a casing and runs in the open.
Figure 26 illustrates an arrangement of my device with the guide vanes and their adjustment located on the side of the primary shaft.
Figure 27 is a half vertical section illustrating a form of my device equipped with two sets of guide vanes and two sets of runner vanes for the purpose of reversing.

In Figure 18, primary blades and wheel 182 are axially shiftable for the purpose of reversing the rotation of the secondary shaft. In Figure 27, the whole, not rotatable, casing 232 is axially shiftable for the same purpose.

In Figure 36 runner 233 integral with vanes 206 and 207, is axially shiftable, thereby bringing either vanes 206 or 207 into operation, which results in very efficient operation at all speeds and loads, because vanes 206 are designed with curvature most suitable for high speeds and light loads, while vanes 207 are most suitable for low speeds and heavy loads.

Figures 28, 31:
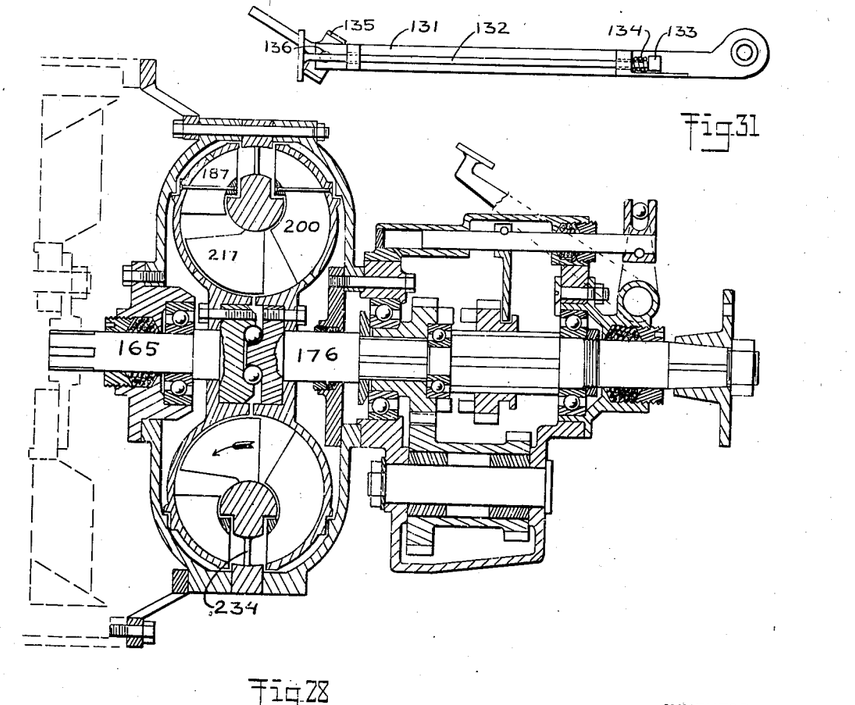
Figure 28 is a longitudinal section illustrating another form of the turbodevice with reverse gear.
Figure 31 is a rear elevation of latch lever assembly.

In Figure 28 is drawn a combination of turbo-transmission with reverse gear. In this design the guide vanes are supported and secured against rotation by thin spokes 234 which are located in the space between the discharge from the impeller and the inlet of the runner.

In Fig. 39 I have illustrated a form of the invention comprising a stationary casing 240 enclosing a pump impeller 192, a turbine runner 209, and a stationary guide wheel 224 interposed between the exit from the runner and the inlet to the impeller. The casing is provided with a sleeve 241 upon which the guide wheel is freely mounted; a one way clutch 242 between the casing 240 and the guide wheel 224 permits rotation of the guide wheel in the same direction as the impeller and the runner rotate, but restrains the guide wheel from rotation in the reverse direction.

What I claim is:
1. A turbine torque converter comprising a passage for fluid including rotary driving vanes, rotary driven vanes, and guide vanes located between the exit from said driven vanes and the entrance to said driving vanes, a ring movable relative thereto, connecting means between said guide vanes and said ring, and means for operating said ring for adjusting the angular position of said guide vanes, and means adapted to cause said ring operating means to function at will, as well as automatically, under the control of fluid, as well as to cease the function of said ring operating means.

2. A turbine torque converter comprising a passage for fluid including an impeller with blades, a turbine runner and a stationary guide wheel with one set of vanes and eccentrically pivoted and movable gates, and means adapted to enable said gates to become free on their pivots and adjust themselves to the direction of the fluid, said impeller blades consisting of two parts, one part being movable and the other part being fixed to the impeller.

3. A turbine torque converter comprising a passage for fluid including rotary driving vanes, rotary driven vanes and stationary guide vanes, the driving, the driven and the guide vanes being coaxial and juxtaposed and forming a circuit in which the fluid is circulating and transmitting power, said driven vanes being divergent and having a discharge angle larger than the entrance angle, said entrance angle being approximately 40° and said discharge angle being approximately 75°.

4. A fluid device for transmitting power having a primary blade wheel adapted to impart energy to a fluid, a secondary blade wheel having fluid channels adapted to receive energy from said energized fluid and to convert the kinetic energy of the fluid into pressure energy, auxiliary means adapted to change the fluid pressure into velocity and to redirect the fluid back to said primary means, said channels being designed to obtain an increase in pressure equal to $(W^{e2}-W^{d2})/2g$ due to the flow through said channels, $W^e$ representing fluid velocity at the entrance of the channels and $W^d$ being fluid velocity at the discharge of the channels, $g$ representing acceleration due to gravity, said channels having smaller divergency at inlet and larger divergency at outlet, said channels having smaller curvature at the inlet and larger curvature at the outlet, said channels further having the inlet angle smaller than the outlet angle, said outlet angle being greater than 45°, openings in one of said blade wheels to balance axial thrust, and a small clearance ring on the last mentioned blade wheel to prevent short circuit losses.

5. A fluid device for transmitting power having primary means adapted to generate energy in a fluid, secondary means having fluid channels capable of receiving energy from said energized fluid, and also capable of changing kinetic energy of the fluid into pressure energy, third means being adjustable and having channels adapted to change the fluid pressure into velocity and to transmit part of the fluid energy back to said primary means, the channel of the secondary means being designed so as to obtain increase in pressure equal to $(W^{e2}-W^{d2})/2g$ due to flow through the channels, and means adapted to control the rate and direction of the fluid flow by adjusting said channels of third means, so as to keep the speed of said primary means practically constant, automatically under the control of the fluid as well as at will, while in operation.

6. A fluid device for transmitting power having primary means adapted to generate energy in a fluid, secondary means capable of receiving energy from said energized fluid and also capable of changing kinetic energy of the fluid into pressure energy, third means adapted to change the fluid pressure into velocity and to transmit part of the fluid energy back to said primary means, and means adapted to eliminate the action of said third means, comprising mechanical means secured to said third means, flexible means operating said mechanical means and means to disconnect said flexible means from said mechanical means, at will, while in operation.

7. A hydraulic apparatus for transmitting power having a casing, fluid in said casing, a rotatable primary blade wheel with curved vanes adapted to energize the said fluid, a secondary rotatable blade wheel with curved vanes capable of receiving energy from said energized fluid, a stationary guide wheel with gates adapted to guide the flow of said fluid in such a way that the fluid enters the primary blade wheel moving in the same direction as that in which said primary blade wheel revolves, and means adapted to change the outlet angle of said stationary gates automatically under the control of the fluid, also to change said outlet angle at will, while in operation.

8. A turbine power transmission comprising a passage for fluid including a pump impeller with two series of vanes, a turbine runner and a guide wheel, the first series of said impeller vanes being capable of yielding to entering fluid, and means to limit said yielding to enable said vanes either to extract energy from the fluid to impart energy to the fluid or to cease to function under the control of said fluid, said first series of vanes being of airfoil or teardrop shape, the impeller, the runner and the guide wheel being coaxial and juxtaposed and forming a circuit in which the fluid circulates and transmits power.

9. A hydraulic apparatus for transmitting power having a casing, fluid in said casing, a rotatable primary blade wheel with curved vanes adapted to energize said fluid, a secondary rotatable blade wheel with curved vanes capable of receiving energy from said energized fluid, a guide wheel with gates adapted to guide the flow of said fluid in such a way that the fluid enters the primary blade wheel moving in the same direction as that in which the said primary blade wheel revolves, said guide wheel having two sets of vanes, the units of the first set being freely pivoted at their leading edges, adjacent to the outlet from the runner vanes, but equipped with stops so as to limit the angle of their inclination in one direction, the units of the second set being eccentrically pivoted and adjustable.

10. In a hydraulic apparatus for transmitting power, a casing, fluid in the casing, a rotatable primary blade wheel adapted to energize the fluid, a secondary rotatable blade wheel adapted to receive energy from the energized fluid, a guide wheel adapted to change angular momentum of the fluid, said wheels forming a circuit in which the fluid circulates and transmits power, the primary wheel having two sets of vanes, the units of the first set being freely pivoted at their leading edges and equipped with two stops to limit the angles of inclination in both directions, the units of the second set being fixed vanes.

11. In a hydraulic power transmission device, the combination, with a primary shaft, of a secondary shaft coaxial with the said primary shaft, and means for transmitting power from said primary shaft to said secondary shaft, comprising a pump impeller mounted on said primary shaft, a turbine runner fastened to said secondary shaft, a fluid redirecting guide wheel juxtaposed to said turbine runner, a stationary casing containing fluid and enclosing said impeller, runner and guide wheel, said impeller, runner and guide wheel having curved passages, which comprise the whole circuit in which said fluid is circulating and power transmitting, several sets of openings in the runner web and several small clearance rings on said runner web, one clearance ring always being located between the two sets of openings, said openings to balance pressure on each side of the web, said clearance rings being provided to prevent short circuit losses.

12. In a motor vehicle, the combination with the engine flywheel and the engine housing of the vehicle, a fluid torque converter, said converter including a casing fastened to said housing, fluid in said casing, a pump impeller connected to said flywheel, a turbine runner with substantially axial discharge, a redirecting guide wheel with movable gates in said casing, each gate being eccentrically pivoted and carrying a spur gear pinion, all said pinions being in mesh with a common ring gear, means for turning said gates and said ring gear automatically under the control of the fluid, and means for turning said ring gear operatively, at will, while in operation.

13. In a motor vehicle, the combination with an engine flywheel and the engine housing of the vehicle, a fluid power transmission, said fluid transmission having a casing, fluid in said casing, blade wheels in said casing, a driving shaft connected to one of said blade wheels, a driven shaft connected to another one of said blade wheels, said driving shaft supported by only one bearing in said casing, the driven shaft being supported by one bearing in the casing, a double thrust bearing between said driving and driven shafts, and means connecting said driving shaft to said flywheel to permit relative longitudinal movement, but to prevent relative rotary movement, said casing being fastened to said housing.

14. A fluid device for transmitting power having a casing, fluid in said casing, blade wheels in said casing, some of said blade wheels having a plurality of series or sets of vanes, the units of some sets of vanes being freely pivoted at their leading edges but equipped with independent stops to limit the angles of their inclination, the first series of vanes being of airfoil or teardrop shape, said stops located in such a way that center lines of said pivoted vanes are at an angle to the flow in the same way as an airplane wing possesses an angle of incidence, said stops being independent from vanes of the other of said sets of vanes.

15. A turbine power transmission comprising a passage for fluid including a pump impeller with a plurality of sets of vanes, a turbine runner, a guide wheel to increase the angular momentum of the fluid, the impeller, the runner and the guide wheel being juxtaposed and forming a circuit in which the fluid is circulating and transmitting power, at least one set of said vanes being of airfoil shape and being capable of yielding to entering fluid, and means to limit said yielding, the plurality of sets of vanes forming a one stage impeller, all of the sets of vanes being adapted to energize the fluid.

16. A power transmission including driving means adapted to energize a fluid, driven means adapted to receive energy from said fluid, means adapted to redirect the fluid from the driven means to the driving means, fluid directing vanes fixed to the driving means, semi-free fluid directing vanes carried by the driving means, stop means carried by the driving means to restrict the movement of said semi-free vanes in two directions, fluid directing vanes fixed to the driven means, semi-free fluid directing vanes carried by the redirecting means, stop means carried by the redirecting means to restrict the movement of said semi-free vanes in one direction, adjustable vanes carried by the redirecting means, and manual means to control said adjustable vanes.

17. A power transmission including driving rotatable means adapted to energize a fluid, driven rotatable means adapted to receive energy from said fluid, third means adapted to redirect the fluid from the driven means to the driving means, fluid directing vanes fixed to driving means, semi-free fluid directing vanes carried by the driving means, stop means carried by the driving means to restrict the movement of said semi-free vanes in two directions, fluid directing vanes fixed to the driven means, semi-free fluid directing vanes carried by the third means, stop means carried by the third means to restrict the movement of said semi-free vanes in one direction, adjustable vanes carried by the third means, manual means to control said adjustable vanes, a casing surrounding the driving and driven means, apertures through one of the rotatable means to balance axial thrust, a driven shaft, said driven means being connected to said driven shaft, and means to collect leakage from the casing.

18. A fluid device for transmitting power, having primary means generating energy in a fluid, secondary means having fluid channels receiving energy from the energized fluid and capable of changing the kinetic energy of the fluid into pressure energy, third means having adjustable channels changing the fluid pressure into velocity, said secondary channels being designed so as to obtain increase in pressure equal to $$(W^{e2} - W^{d2})/2g$$

due to the flow through the channels, where $W^e$ represents fluid velocity at the entrance of the channel, $W^d$ the fluid velocity at the discharge from the channel, and $g$ is acceleration due to gravity, said primary, secondary and third means being coaxial and comprising the circuit in which the fluid circulates and transmits power and means to control the rate and direction of the fluid flow by varying the area of the channels of the third means, so as to keep the speed of the primary means practically constant while in operation.

19. A fluid device for transmitting power having primary means generating energy in a fluid, secondary means receiving energy from the fluid, third means changing angular momentum of the fluid, and means to eliminate the action of the third means comprising mechanical means secured to the third means, flexible means operating the mechanical means, a casing containing the primary, secondary and third means, means fastened to the casing to disconnect the flexible means from the mechanical means at will while in operation.

20. A fluid device for transmitting power having a casing, fluid in the casing, a primary blade wheel energizing the fluid, a secondary blade wheel receiving energy from the fluid, a guide wheel adapted to change the angular momentum of the fluid, the primary and secondary blade wheels forming a circuit in which the fluid circulates and transmits power, the primary wheel having two sets of vanes, the units of the one set being eccentrically and freely pivoted, and stop means to limit the angles of their inclination in both directions.

21. A fluid device for transmitting power having a casing, fluid in the casing, blade wheels in the casing, some of the blade wheels having a plurality of series or sets of vanes, the units of some sets of vanes being eccentrically and freely pivoted but equipped with stops to limit the angles of their inclination, the stop members being located in such a way that center lines of the pivoted vanes are at an angle to the flow after engagement with one of said stops in the same way as an airplane wing possesses an angle of incidence, the stop members being independent from the vanes of the other of the sets of vanes.

22. A fluid power transmission comprising a passage for fluid including an impeller having a plurality of series of vanes, a turbine runner and a guide wheel, one series of the impeller vanes being yieldable to the fluid, and means to limit the yielding movement to enable the vanes either to extract energy from the fluid or to impart energy to the fluid, under the control of said fluid.

23. A fluid device for transmitting power having a primary blade wheel imparting energy to a fluid, a secondary blade wheel having fluid channels receiving energy from the fluid, a third wheel changing the angular momentum of the fluid, said wheels forming a circuit in which the fluid circulates and transmits power, the channels being designed to obtain an increase in pressure equal to $(W^{e2}-W^{d2})/2g$ due to flow through said channels, $W^e$ representing fluid velocity at the entrance of the channels and $W^d$ representing fluid velocity at the discharge of the channels, $g$ representing acceleration due to gravity, said channels having smaller divergency at the inlet and larger divergency at the outlet, the outlet angle being greater than 45°.

24. A power transmission including driving means energizing fluid, driven means receiving energy from fluid, and third means changing angular momentum of the fluid, semi-free fluid directing means carried by the driving means, stop means carried by the driving means to restrict the movement of the semi-free vanes in two directions, semi-free fluid directing vanes carried by the third means, stop means carried by the third means to restrict the movement of the semi-free vanes.

25. In a fluid power transmission having a casing, means comprising a pump impeller having a set of fixed vanes and a set of flexible vanes, a turbine runner and a guide wheel forming a power transmitting fluid circuit in the casing, means to shift the impeller axially with respect to the fluid circuit, and means to restrict the flexing of said flexible vanes.

26. In a hydraulic coupling the combination with a drive shaft and an impeller having two sets of vanes, a driven shaft and a runner, an exterior housing movable longitudinally on said shafts, the runner being attached to said housing, means engaging the housing for controlling the transmission of power through the coupling, the units of the first set of vanes on the impeller being freely pivoted at their leading edges, and stop means to limit the inclination of the pivoted vanes.

27. In a hydraulic coupling, the combination with a drive shaft and an impeller having two sets of vanes, a driven shaft and a runner, the runner being attached to said housing, an exterior housing longitudinally movable on said shafts, and means for shifting said housing axially for controlling the transmission of power from the impeller to the runner, the units of the first set of vanes on the impeller being freely pivoted at their leading edges, and stop means to limit the inclination of the pivoted vanes.

28. An hydraulic transmission including in combination two devices, namely, a rotary pump, a turbine operated by the fluid discharged from the pump and arranged to return the fluid to the pump the impelling surfaces of said pump and the impelled surfaces of said turbine being at fixed angles to their planes of rotation, and a redirector between said two devices, the pump, the turbine and the redirector being co-axial with one another and the redirector having vanes which are continuous from one edge to the opposite edge and which change the direction of the fluid in its passage from one to the other of said devices, said vanes being angularly adjustable automatically when the output of fluid increases to a position which diminishes the difference between the tangential components of the velocities of the fluid at the admission and at the discharge ends respectively of the pump vanes, thus tending to maintain constant the net moment of the forces on the pump while permitting an increase in output to balance an increase in the load on the turbine.

29. An hydraulic transmission including in combination two devices, namely, a rotary pump, a turbine operated by the fluid discharged from the pump and arranged to return the fluid to the pump the impelling surfaces of said pump and the impelled surfaces of said turbine being at fixed angles to their planes of rotation, and a redirector between said two devices, the pump, the turbine and the redirector being co-axial with one another and the redirector having vanes which are continuous from one edge to the opposite edge and which change the direction of the fluid in its passage from one to the other of said devices, said vanes being angularly adjustable automatically when the output of fluid increases to a position which increases the tangential component of the velocity of the fluid at the admission end of the pump vanes.

30. An hydraulic transmission including in combination two devices, namely, a rotary pump, a turbine operated by the fluid discharged from the pump and arranged to return the fluid to the pump the impelling surfaces of said pump and the impelled surfaces of said turbine being at fixed angles to their planes of rotation, and a redirector between said two devices, the pump, the turbine and the redirector being co-axial with one another and the redirector having vanes which are continuous from one edge to the opposite edge and which change the direction of the fluid in its passage from one to the other of said devices and means for diminishing the difference between the tangential components of the velocities of the fluid at the admission and at the discharge ends respectively of the pump vanes automatically when the output of fluid increases.

31. An hydraulic transmission including in combination two devices, namely, a rotary pump, a turbine operated by the fluid discharged from the pump and arranged to return the fluid to the pump the impelling surfaces of said pump and the impelled surfaces of said turbine being at fixed angles to their planes of rotation, and a redirector between said two devices, the pump, the turbine and the redirector being co-axial with one another and the redirector having vanes which direct the fluid in its passage from the turbine to the pump and thus determine the direction and the tangential component of the velocity of the fluid entering the pump, said vanes being continuous from one edge to the other and yieldingly held to the position corresponding to the minimum tangential component and being automatically adjustable by the pressure of the fluid to increase said tangential component and thus diminish the difference between said tangential components at the exit and entrance ends respectively of the pump.

32. An hydraulic transmission including in combination two devices, namely, a rotary pump, a turbine operated by the fluid discharged from the pump and arranged to return the fluid to the pump the impelling surfaces of said pump and the impelled surfaces of said turbine being at fixed angles to their planes of rotation, and a redirector between said two devices, the pump, the turbine and the redirector being co-axial with one another and the redirector having vanes which are continuous from one edge to the opposite edge and which change the direction of the fluid in its passage from one to the other of said devices and which when the output of fluid increases, diminishes the difference between the tangential components of the velocities of the fluid at the admission and at the discharge ends respectively of the pump vanes, thus tending to maintain constant the net moment of the forces on the pump while permitting an increase in output to balance an increase in the load on the turbine, said redirector vanes being automatically angularly adjustable to compensate in increasing degree for increases in output.

33. A hydraulic transmission including in combination and co-axially mounted, a pump having impelling blades in fixed position thereon, a turbine having driven blades in fixed position thereon, and a redirector having blades between said pump and said turbine which are continuous from one edge to the other and pivotally mounted to vary the angle of their impelling surface to the planes of rotation of said transmission, and means to vary said angle with changes in relative speeds of said pump and turbine, said pump, turbine and redirector being arranged in a closed series in which the transmission fluid passes through said pump and turbine blades once in each series.

34. The apparatus of claim 33 in which said redirector blades are pivoted at their leading edges.

JOSEPH JANDASEK.